United States Patent [19]

Ikeda et al.

[11] Patent Number: 4,748,454
[45] Date of Patent: May 31, 1988

[54] DEVICE FOR INDICATING WAVEFORM POSITION OF A DOT ARRAY RECORDER

[75] Inventors: Hiroshi Ikeda; Katsuhiro Adachi, both of Tokyo, Japan

[73] Assignee: Nihon Kohden Corporation, Tokyo, Japan

[21] Appl. No.: 49,123

[22] Filed: May 12, 1987

[30] Foreign Application Priority Data

May 16, 1986 [JP] Japan .............................. 61-73765[U]

[51] Int. Cl.$^4$ .......................... G01D 9/00; B41J 29/42
[52] U.S. Cl. ...................................... 346/17; 346/35; 400/120; 400/709; 400/711
[58] Field of Search ..................... 400/705, 705.1, 709, 400/711, 120; 340/815.3, 753, 754; 346/17, 35

[56] References Cited

U.S. PATENT DOCUMENTS

| | | | |
|---|---|---|---|
| 3,795,863 | 3/1974 | Umeda | 340/815.03 X |
| 3,914,758 | 10/1975 | Ingle | 340/793 X |
| 4,039,956 | 8/1977 | Shimanek | 340/753 X |
| 4,155,084 | 5/1979 | Klees | 340/793 X |
| 4,237,457 | 12/1980 | Houldsworth | 340/728 |
| 4,318,152 | 3/1982 | Weber | 340/753 X |
| 4,649,399 | 3/1987 | Kimura | 346/17 X |

Primary Examiner—Paul T. Sewell
Attorney, Agent, or Firm—Hoffmann & Baron

[57] ABSTRACT

The present invention relates to a dot array recorder having a dot array head carrying an array of the dot printing elements arranged in a plurality of groups, and for effecting dot printing at positions corresponding to the levels of an input print signal. The dot array recorder also includes an LED array having a plurality of LEDs arranged at positions corresponding to the groups of the dot printing elements, wherein the LED belonging to the group of dot printing elements having the element corresponding to the level of an input print signal, illuminates. Marks are provided on the LED array surface at positions between pairs of LEDs on both sides of a reference line and other graduation lines.

4 Claims, 2 Drawing Sheets

DEVICE FOR INDICATING WAVEFORM POSITION OF A DOT ARRAY RECORDER

BACKGROUND OF THE INVENTION

1. Field of the Invention

The present invention relates generally to dot array recorders (i.e., printers) for recording waveforms and the like, wherein the dot array recorders have a dot array printing head in which the dot printing elements are arranged in a row. More particularly, the present invention relates the such dot array recorders which include a LED (light emitting diode) array having a plurality of LED's corresponding to the group of dot printing elements which are illuminated as to indicate the position of the printing.

2. Setting for the Invention

When using thermal array recorders or electrostatic recorders, which have no recording pen, it often becomes necessary to be capable of indicating the position of the waveforms to be printed such as for purposes of adjusting the reference line for recording, or the sensitivity of the recorder.

With prior art type dot array recorders whose dot array printing heads are equipped with LED arrays which correspond with the groups of printing elements, the user is thereby enabled to recognize the printing position in such printers. With such printing heads, the LEDs are arranged as densely as possible, e.g., at a 1 mm pitch over the entire length, e.g., 200 mm, of the thermal head. In consequence, although the position of the waveform can be indicated with high accuracy due to the small pitch of the arrangement of the LEDs, the apparatus as a whole becomes very expensive and uneconomical to manufacture.

In addition, since it is rather difficult to discriminate the lighting position, the user who wishes to adjust the reference line for the recording or setting the sensitivity of the recorder, has to actually drive the recorder to print the reference signal on the recording paper and to adjust the printer such that the position of the printed reference signal coincides with the position of the reference line.

Accordingly, an object of the present invention is to provide a device for indicating the position of a waveform to be recorded using a dot array recorder, wherein the reference position adjustment can be easily conducted on the LED array surface, while reducing the number of the LEDs required to achieve the same.

Another object of the present invention is to provide a device for indicating the waveform position of a dot array recorder which does not require the user thereof to actually drive the recorder to print the reference signal on the recording paper, or adjust the printer such that the position of the printed reference signal coincides with the position of the reference line.

Other and further objects of the present invention will be explained hereinafter and will be more particularly delineated in the appended claims, and other objects of the present invention will, in part, be obvious hereinafter to one with ordinary skill in the art to which the present invention pertains, and will, in part, appear obvious hereinafter.

SUMMARY OF THE INVENTION

According to the principles of the present invention, there is provided a device for indicating the position of a waveform to be recorded by a dot array printer, which comprises a dot array head having an array of dot printing elements arranged in a plurality of groups and for effecting dot printing at positions corresponding to the levels of an input print signal. The dot array recorder also includes an LED array comprising an array of LEDs arranged at positions corresponding to the respective groups of the dot printing elements. The dot array recorder hereof also includes a mark which is provided at least between a pair of LEDs corresponding to the reference line position between groups of dot printing elements, where the LEDs on both sides of the mark are adapted to illuminate intermittently by noises contained by an input print signal of a level corresponding to the mark position, when such signal is applied to the dot array printer.

With this arrangement, it is possible to align the position of the waveform to be recorded with respect to the reference line on an LED array surface which has a reduced number of LEDs as compared with the conventional device. The adjusting operation for attaining the alignment can be easily conducted because such alignment is confirmed by checking whether the LEDs on both sides of the reference line mark, illuminate intermittently. The precision of alignment also is improved for the same reason. The reduction in the number of the LEDs does not cause any inconvenience in the observation of the varying waveform position during the operation of the recorder. Sensitivity adjustment also can be conducted easily and accurately by providing graduation marks using the reference line mark as the basis for the graduation.

DESCRIPTION OF THE PREFERRED EMBODIMENT

Figure 1:
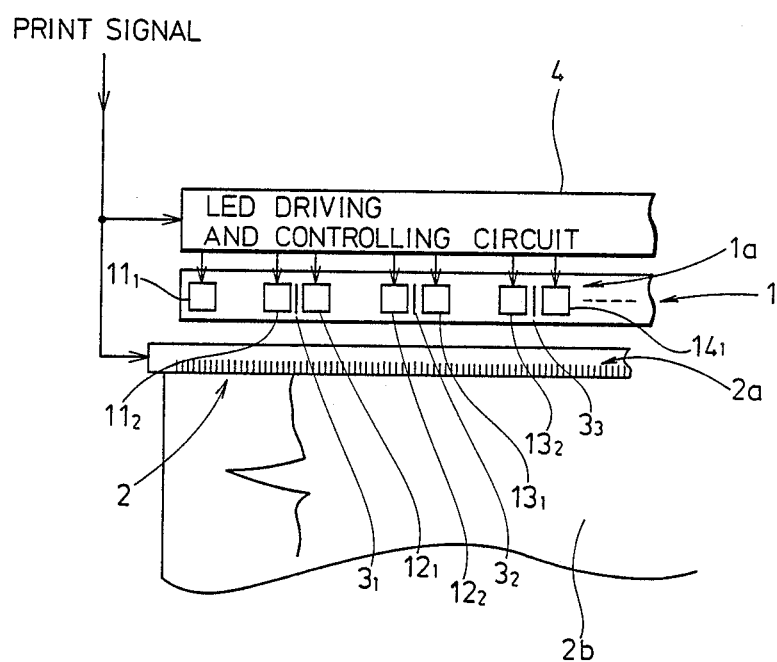
FIG. 1 is a schematic diagram of a device for indicating the position of waveform to be recorded by a dot array recorder constructed in accordance with the principles of the present invention.

Referring to FIG. 1, a dot array recorder to which the present invention pertains includes a dot array head 2 which has a multiplicity of dot printing elements 2a at arranged in a row, which are well known to those skilled in the art. Dot printing elements 2a are disposed at positions corresponding to the levels of print signals provided as input to the recorder. In operation, the dot printing elements 2a are activated to print dots on a recording paper 2b which moves continuously past the dot array head 2. An LED array 1 is disposed in a side-by-side relationship with respect to the dot array head 2. The LED array 1 has an array surface 1a, to which a plurality of marks $3_1, 3_2, 3_3 \ldots$ are provided at a pitch corresponding to a predetermined increment of amplitude of the input signal. A pair of LEDs are disposed on both sides of each mark. The pair of LEDs are indicated at $11_2, 12_1$; $12_2, 13_1$; and $13_2, 14_1$. Thus, each LED belongs to half of the dot printing elements 2a of the element between adjacent marks.

The LEDs are adapted to be driven by an LED driving and controlling circuit 4 which receives print signals. When the print signal (received by the LED driving and controlling circuit 4), has a level corresponding to a dot printing element which belongs to the left half part of the dot printing element group which is on the left side of the mark $3_1$ as viewed in the drawings, then the circuit 4 drives the LED $11_1$. Similarly, the LED $11_2$ is energized when the level of the print input signal supplied to the circuit 4 corresponds to one of the dot printing elements $2a$ belonging to the right half part of the dot printing element group on the left side of the mark $3_1$. It will be seen that the LED $12_1$ illuminates when the input print signal has a level corresponding to one of the dot printing elements $2a$ belonging to the left half part of the dot printing element group between the marks $3_1$ and $3_2$. In this manner, the LED driving and controlling circuit 4 drives the LED which belongs to the group of the dot printing elements $2a$ to be actuated. The LED driving and controlling circuit 4 may be of a type as shown in FIG. 2.

Thus, the LED $11_1$ illuminates when the level of the input print signal is low, and the LED $11_2$ illuminates when the level of the input print signal is increased to a certain level. When the level corresponding to the mark $3_1$ is reached, the LED $12_1$ also illuminates due to the circuit noises superimposed on the input print signal. In consequence, both the LEDs $12_2$ and $13_1$ on both sides of the mark $3_1$ illuminate so that the operator can know that the level of the input print signal corresponds to the mark $3_1$. One of these marks is used as the reference line, while other marks are used as graduation lines.

It is, therefore, possible to calibrate the reference line and the graduation lines by conducting the level adjustment such that the LEDs on both sides of the reference line mark illuminate. It will also be seen that not only the signal level exactly the same as graduation line marks, but also levels of intermediate between adjacent marks, can be indicated in two stages.

Figure 2:
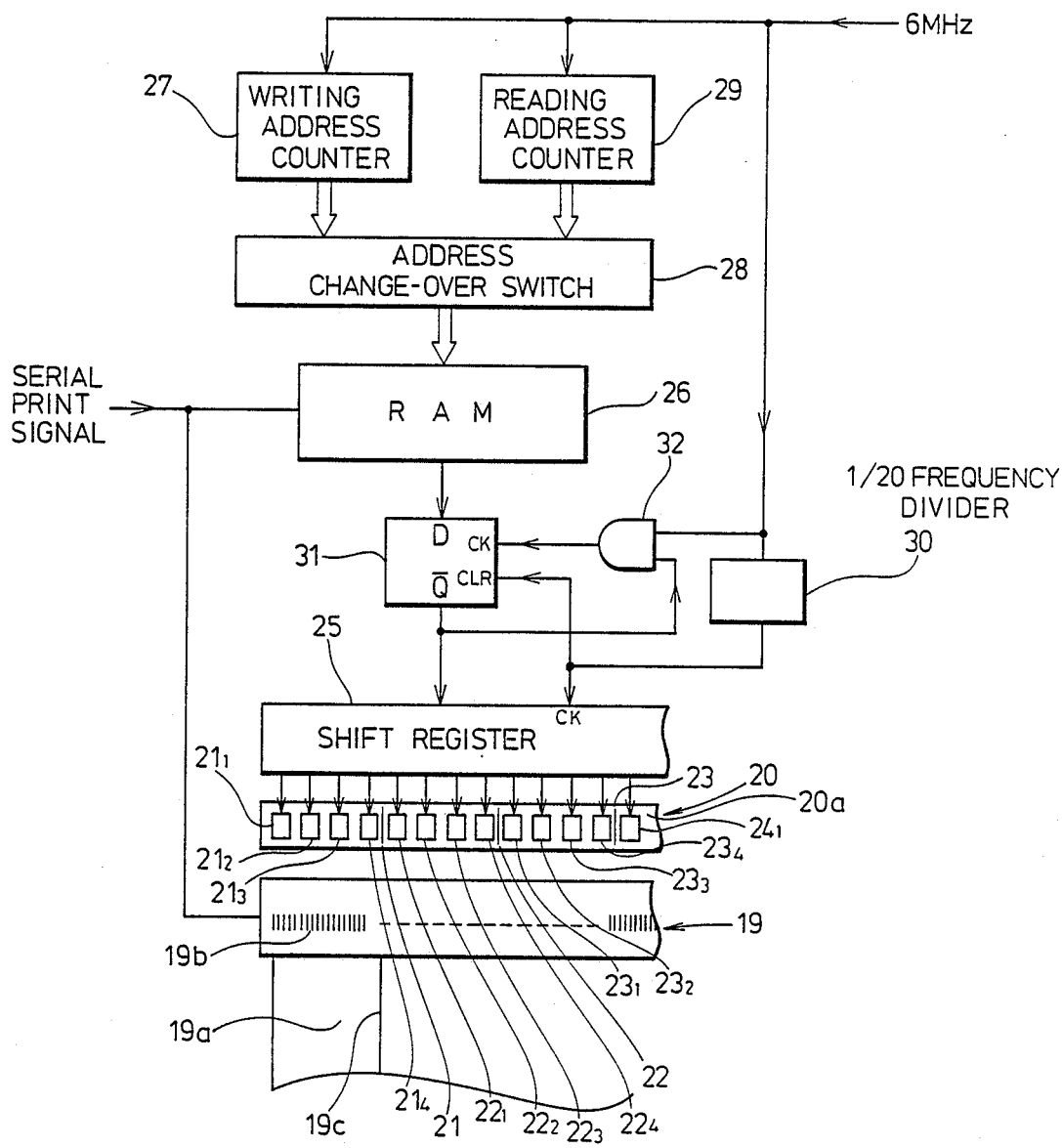
FIG. 2 is a block diagram of a preferred embodiment of the device of FIG. 1 constructed in accordance with the principles of the present invention.

FIG. 2 shows a practical arrangement of a preferred embodiment of the present invention. A thermal array recorder to which the present invention pertains has a thermal print head 19 having 1728 thermal dot printing elements $19b$ arranged at a pitch of 0.125 mm. A reference numeral 20 designates an LED array which is disposed in a side-by-side relationship with respect to the thermal print head 19. The LED array comprises 80 LEDs arranged at a pitch of 2.54 mm. That is, one LED is used for each of a plurality of dot printing element groups, each group comprising 20 dots, i.e., 20 dot printing elements $19b$. Each group of 80 dot printing elements $19b$, i.e., four groups of 20 dot printing elements $19b$, corresponds to a voltage increment of the amplitude of the input print signal. Thus, marks 21, 22, 23 ... are provided on the LED array surface $20a$ for every group of 80 dot printing elements $19b$.

Four LEDs $21_1$ to $21_4$, $22_1$ to $22_4$, $23_1$ to $23_4$ ... belong to respective marks.

The thermal array recorder further has a shift register 25 for driving the LED. The shift register 25 is adapted for supplying output signals of "0" level to the LEDs $21_1$ to $21_4$, ... $23_1$ to $23_4$ corresponding to the levels of the input signal. A reference numeral 26 designates a RAM (Random Access Memory) which is adapted for storing serial print signal supplied to the thermal head 19. Writing of data in the RAM is performed by a writing address counter 27 which steps in response to clock pulses of a 6 MHz clock which is in synchronization with the input print signal. After the writing is over, an address change-over switch 28 is actuated as to enable the stored data to be read by a reading address counter 29 in response to clock pulses of the 6 MHz clock. A reference numeral 30 designates a frequency divider which counts down the clock rate by a factor of 1/20. A D-type flip-flop 31 is adapted for receiving and holding the dot data stored in the RAM 26 for each input of the clock. When a dot data "1" is received, the flip-flop 31 delivers the $\overline{Q}$ output to the shift register 25, while interrupting the clock input until it is cleared by the 1/20 clock in the AND gate 32. The D-type flip-flop 31 loads the "0" signal on the shift register 25 when at least dot data "1" is read from the RAM 26 for each dot printing element group. The shift register 25 then steps at 1/20th the pulse rate of the 6 MHz clock so as to deliver the "0" signal to the associated LED. Taken together, the parts 25 to 32 explained hereinbefore constitutes the LED driving and controlling circuit of FIG. 1 described and explained above.

The device of the invention for indicating the position of waveform operates in a manner which will be explained hereinunder.

The following explanation is based on an assumption that the mark 21 is to be used as the reference line. When a serial print signal of D.C. current corresponding to a set value is input to the device, dot data are held in respective stages of the shift register 25 annexed to the thermal dot printing elements $19b$, and the printing element corresponding to the level of this signal is driven in a manner which is well known in the art. In consequence, a line $19c$ is drawn on the recording paper sheet, as this signal is continuously applied to the thermal print head 19. This print signal is also stored in the RAM 26 by the operation of the writing address counter 27, and is repeatedly read out by the reading address counter 29 in such a manner as to avoid any flickering, until the next writing operation is conducted. That is, the RAM 26 delivers once or more times the dot data "1" at the address corresponding to the print signal level. The $\overline{Q}$ output of the D-type flip-flop 31 delivers the "0" signal to the shift register 25 each time RAM 26 produces the dot data "1", thereby illuminating one of the LEDs $21_1$ to $24_1$.

It is assumed here that the signal level is correctly set at the level corresponding to the position of the mark 21. The print signal carries noises which have been superimposed thereto when it is processed in the form of analog signal. Therefore, at least a serial print signal appointing the $20 \times 4$ th dot of the thermal dot printing elements $19b$ is provided as input so that the RAM 26 outputs the data "1" at the address corresponding to the $20 \times 4$ th dot. Each time the RAM 26 delivers the data, the $\overline{Q}$ output of the D-type flip-flop 31 delivers the "0" signal to the shift register 25, thus driving the LED $21_4$. At the same time, when a print signal corresponding to the $(20 \times 4+)$ th dot of the dot printing elements $19b$ is provided as input, the LED $22_1$ which is on the opposite side of the mark 21 illuminates. Thus, the LEDs $21_4$ and $22_1$ on both sides of the mark 21 illuminate so as to inform the operator of the fact that the level of the input signal corresponds to the position of the reference mark 21.

The adjustment of the sensitivity is conducted in the following manner. Signals with levels of 1 volt increments are supplied successively and the voltages of these signals are adjusted such that first the LEDs $22_4$ and $23_1$ on both sides of the graduation mark 22 illuminate, and then the LEDs $23_4$ and $24_1$ on both sides of the mark 23 illuminate. As the waveform signal is provided as input with the reference line and the sensitivity adjusted in the described manner, the position of the waveform is displayed on the LED array with a resolution corresponding to 20 dots of the thermal dot printing elements 19b.

In the described embodiment, when the noise level falls within 1/80th of 1 volt, the sensitivity adjustment can be conducted with a small error not to exceed 1 dot. Actually, the error will not exceed 1 dot when the adjustment is conducted such that the intensity levels on both sides of the mark are balanced. Superimposition of noise is inevitable in analog circuits when the noise components are extinguished without conversion. When the signals are converted into a serial print signal, it is possible to use a separate digital-type noise generating circuit for the purpose of generating noise. Namely, noise is forcibly superimposed on to the serial print signal such as to alternatingly vary the serial print signal by amount corresponding to one dot printing element and at such a speed as not to cause any flicker.

Further modifications of the present invention herein disclosed, will occur to persons skilled in the art to which the present invention pertains, and all such modifications are deemed to be within the scope and spirit of the present invention defined by the appended claims.

What is claimed is:

1. A device for indicating the position of a waveform to be recorded by a dot array recorder comprising:
    a dot array head having an array of dot printing elements arrranged in a plurality of groups and for effecting dot printing at positions corresponding to the levels of an input print signal;
    an LED array having an array of LEDs arranged at positions corresponding to the respective groups of said dot printing elements;
    a mark provided between at least a pair of LEDs which belong to two adjacent groups of said dot printing elements, and at a position where a reference line of said recorder is to be placed; and
    an LED driving and controlling circuit electrically coupled to the LED array for driving the LEDs, the LEDs arranged at positions corresponding to the respective groups of said dot printing elements being driven when said input print signal is at a level which corresponds to said respective groups of said dot printing elements, the LED driving and controlling circuit being adapted to drive said pair of LEDs intermittently to allow the position of the waveform to be recorded to be aligned at the mark between said pair of LEDs.

2. A device for indicating position of waveform to be recorded by a dot array recorder according to claim 1, wherein said mark is provided between each pair of adjacent LEDs belonging to adjacent groups of said dot printing elements at a pitch corresponding to a predetermined increment of amplitude of said input print signals.

3. A device for indicating position of waveform to be recorded by a dot array recorder according to claim 1, wherein two LEDs are disposed between adjacent marks.

4. A device for indicating position of waveform to be recorded by a dot array recorder according to claim 1, wherein three or more LEDs are disposed between adjacent marks.

* * * * *